(12) United States Patent  (10) Patent No.: US 7,757,727 B2
Handa  (45) Date of Patent: Jul. 20, 2010

(54) HIGH PRESSURE GAS TANK HEAT MANAGEMENT BY CIRCULATION OF THE REFUELING GAS

(76) Inventor: Kiyoshi Handa, 21001 State Route 739, c/o Honda R&D Americas, Inc., Raymond, OH (US) 43067-9705

( * ) Notice: Subject to any disclaimer, the term of this patent is extended or adjusted under 35 U.S.C. 154(b) by 690 days.

(21) Appl. No.: 11/748,079

(22) Filed: May 14, 2007

(65) Prior Publication Data
US 2008/0216914 A1  Sep. 11, 2008

Related U.S. Application Data

(63) Continuation-in-part of application No. 11/682,574, filed on Mar. 6, 2007, and a continuation-in-part of application No. 11/682,470, filed on Mar. 6, 2007.

(51) Int. Cl.
*B65B 1/04* (2006.01)
(52) U.S. Cl. ...................................... 141/82

(58) Field of Classification Search .................. 141/82, 141/2, 18, 98, 286, 67; 62/50.1–50.5; 123/525; 137/255, 263; 272/146.1, 146.6
See application file for complete search history.

(56) References Cited

U.S. PATENT DOCUMENTS
7,377,294 B2 * 5/2008 Handa .......................... 141/82

* cited by examiner

*Primary Examiner*—Steven O Douglas
(74) *Attorney, Agent, or Firm*—Mark E. Duell; Porter Wright Morris & Arthur, LLP

(57) ABSTRACT

A heat management system for a high pressure gas tank comprising a loop circulation path for the gas including a path through an internal heat exchanger in the tank and a path through a heat exchanger external to the tank, wherein, in the instance of refueling, the refueling gas circulates multiple times in the loop through the internal heat exchanger and the external heat exchanger and in the course of circulation, a portion of the gas from the refuel line is introduced into the tank. In a reverse circulation during driving, the tank is warmed by heat exchange from the external heat exchanger to the internal heat exchanger.

13 Claims, 8 Drawing Sheets

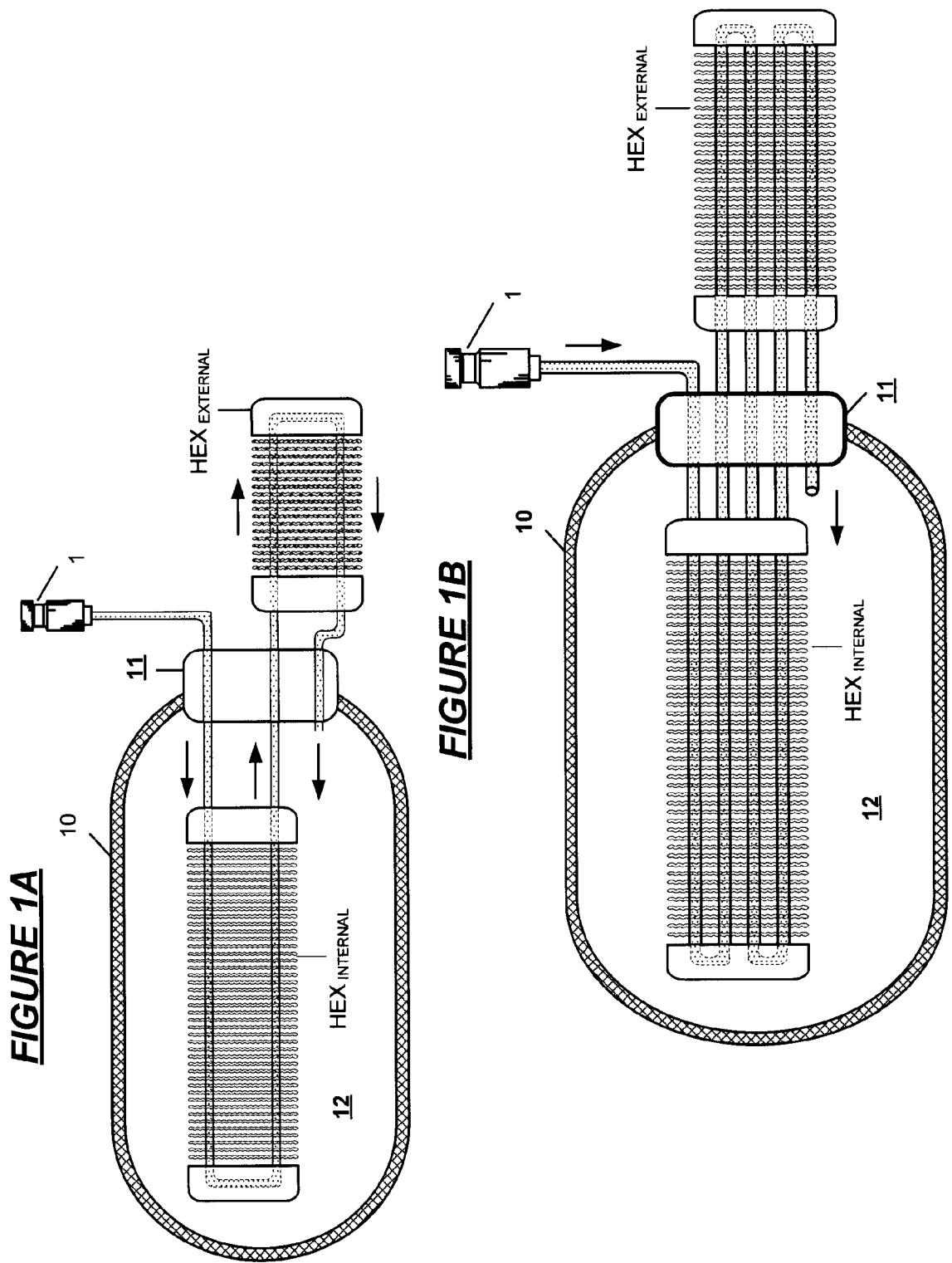

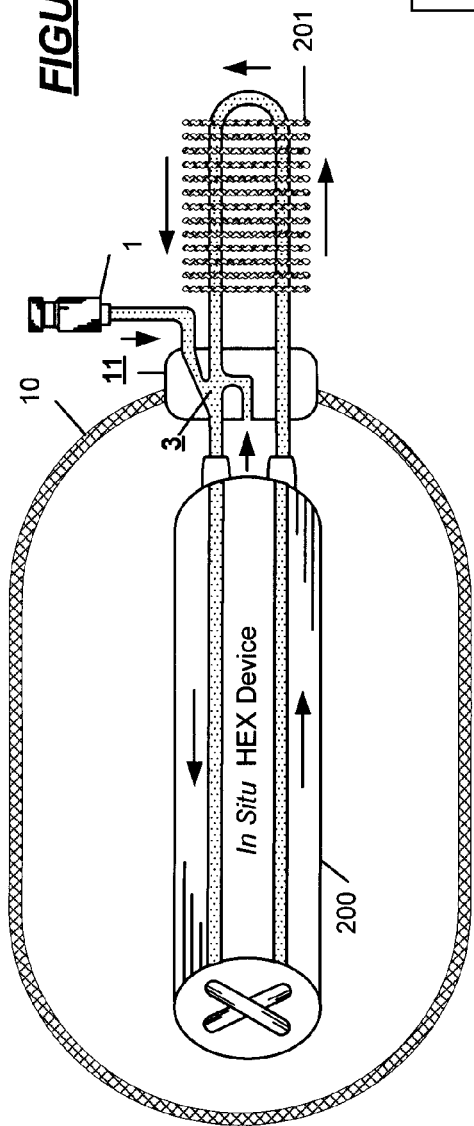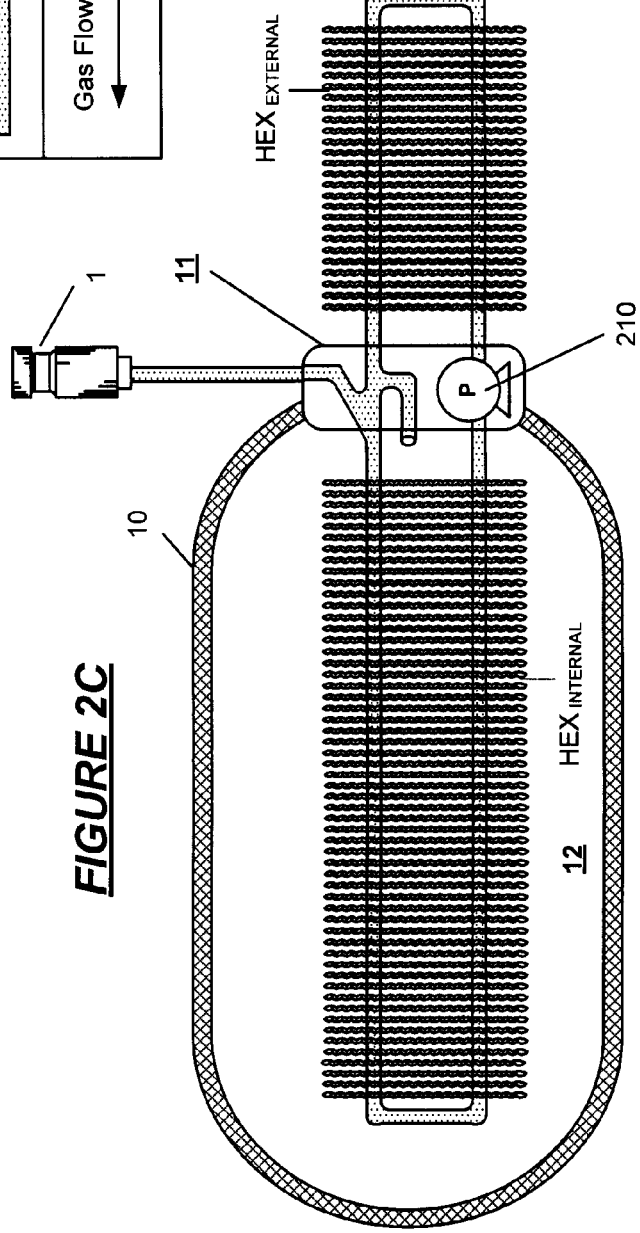

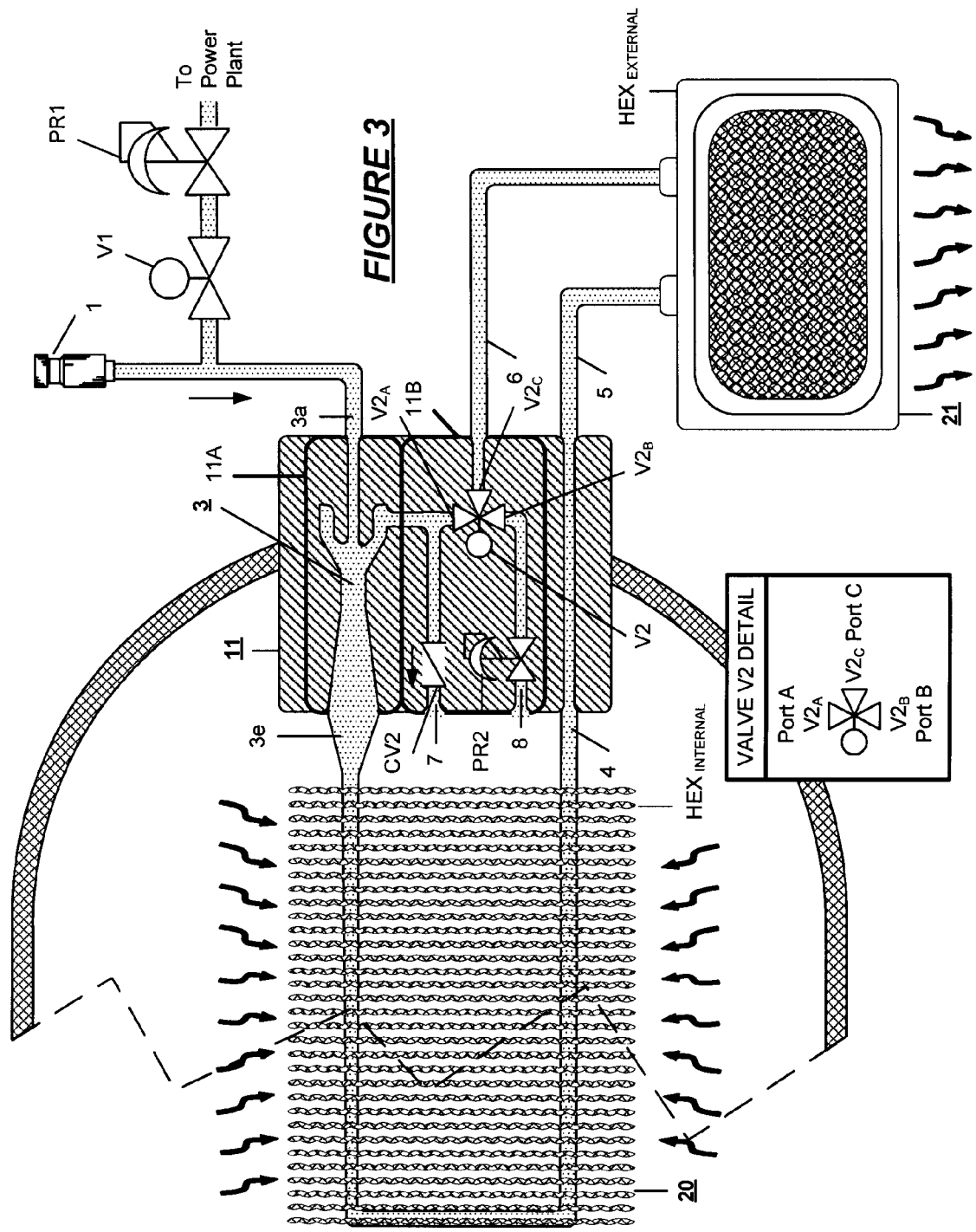

REFUELING

DRIVING

HIGH PRESSURE GAS TANK HEAT MANAGEMENT BY CIRCULATION OF THE REFUELING GAS

RELATED APPLICATIONS

This application is a continuation in part of my co-pending applications for United States Letters Patent High Pressure Gas Tank Cooling by Ejector Pump Circulation, Ser. No. 11/682,574 filed on Mar. 6, 2007 and Gas Flow Management Equipment for High Pressure Gas Storage Tanks Ser. No. 11/682,470 filed on Mar. 6, 2007.

FIELD OF THE INVENTION

The present invention relates to a system for efficiently cooling high pressure refill gas that is to be stored in fuel tanks, typically, hydrogen gas and compressed natural gas introduced to the tank at a refueling station. Onboard high pressure tank cooling is effected by circulation of the refill gas using a Venturi or ejector pump.

BACKGROUND OF THE INVENTION

Typically, in motor vehicles using hydrogen to power fuel cells or using hydrogen and compressed natural gas (CNG) to power internal combustion engines, present practice is that fuel is stored in on board tanks maintained at a maximum pressure in the range of about 5000 psi for hydrogen and 3600 psi for CNG. Higher pressures in the range of about 10,000 psi or more are anticipated as the use of hydrogen and CNG becomes more prevalent. I have developed in situ techniques to manage thermal energy differences between high pressure gas in a tank and the environment of the tank; the devices involve heat exchangers fixed within the tank (to absorb and radiate heat) operatively interconnected with an external heat exchanger (correlatively to radiate and absorb heat) in the sequence of the refill and exhaustion of the high pressure gas within the tank. The background of the invention is extensively detailed in my above referenced related application and my previous applications referenced therein. In the specification herein, reference to hydrogen storage tanks correlates with the use of the invention with CNG (compressed natural gas) storage tanks. Although hydrogen is principally referred to in the specification and examples, "hydrogen" is a term in most instances intended to be interchangeable with CNG and both are referred to as a "gas" or "high pressure gas." Both hydrogen and CNG are high pressure gases with which the invention is useful, typically, but not necessarily, in motor vehicle applications.

Conventionally, high pressure gas vehicle fuel tanks are cylindrical with hemispherical ends and are formed from reinforced fiber composite material (e.g., a carbon fiber exterior winding and an aluminum alloy/plastic interior liner) and, in their various designs, are capable of storing a charge of high pressure gas at an approximately 5000 psi for hydrogen and approximately 3600 psi for CNG, and up to 10,000 psi or more at a maximum rated pressure capacity at a defined temperature. Various designs for high pressure hydrogen refueling stations have been proposed to deal with refueling efficiencies. When the on board fuel tanks of a hydrogen powered vehicle are filled with hydrogen, the pressurized on board gas in the tanks may be characterized as having multiple forms of energy: 1) chemical energy associated with the hydrogen fuel itself (consumed in powering the vehicle), and 2) thermodynamic energy, namely, the mechanical, thermal and internal energy associated with the physics of high pressure refueling of a tank from sources of fuel at the high pressure gas refuel depot.

During a high pressure refueling process involving hydrogen and CNG fueled vehicles, gas within the interiors of the on board storage tanks becomes heated as a result of fuel gas compression when the tank pressure increases and other refueling parameters affect the refill. After refueling, the interior temperature of the gas within the tank and the pressure within the tank both decrease slowly as the fuel gas is consumed during vehicle operation. Conventionally, it is not possible to obtain a full refill tank pressure without pressure compensation during the course of refueling. The charge of fuel pressure input into and stored in the tank must be, at refill (because of the heating compression of the gas), initially in excess of the tank design pressure. Without pressure compensation (an initial overfill), vehicle mileage range is reduced because a full fill is not obtained. When higher optimum tank design pressures are encountered, this condition is exacerbated.

In one response to the overfill dilemma, a slower flow rate may be used during refill, which will result in a lower internal tank temperature, and higher pressure, and increased capacity over time. An undesirable consequence of a slower flow rate during refueling to avoid heat build up is self evident—a longer refueling time. Another solution proposes to cool the station fuel gas before the refueling gas is introduced into the tank; external pre-cooling, however, requires substantial energy, thereby reducing the overall efficiency of a hydrogen/CNG economy. Pre-cooling or other pre treatment of the high pressure refuel gas is generally unnecessary when fill pressures are at 5000 psi or lower, however, as pressures approach or exceed 10,000 psi, cooling (and its opposite, internal tank heating by compression) becomes an important factor in the refueling process.

A pressure overfill as an option likewise requires additional energy expense where additional gas compression is involved and further increases the heat generated in the tank as a result of high pressure compression during the refill process. As tank pressures exceed 3600 psi (for CNG) and 5000 psi and approach or exceed 10,000 psi (for hydrogen), secondary treatment such as cooling becomes an important factor in the refueling process to achieve a full tank capacity fill. When a full fill is achieved, 1) overall vehicle range per each tank refill thereby increases, 2) energy required for a refill (such as for precooling or a pressure overfill) is reduced, 3) time is saved, and 4) overall customer satisfaction increases.

OBJECTS OF THE INVENTION

It is an object of the present invention to minimize energy loss and increase refueling efficiency in hydrogen refilling systems when factored into the overall energy efficiency of an infrastructure of high pressure gas powered vehicles and fuel depots for the consumer dispensation of high pressure fuel. Typically, each time a vehicle is refueled with hydrogen, mechanical compression transforms into thermal energy and results in the heating of refueled gas in the tank, hence, it is an object of the invention to minimize tank heating and to increase the efficiency and refueling capacity of an on board fuel storage tank in a hydrogen powered motor vehicle. It is an object of the invention to minimize high pressure gas tank heating and to increase the efficiency and refueling capacity of an on board fuel storage tank in high pressure gas powered motor vehicles. It is an object of the invention to provide a system that can remove the compression heat resulting from refueling an on board tank during high pressure refueling. An avoidance of secondary gas cooling pretreatment and/or pressure overfill, a speedier refueling time, increased refueling efficiency, and an extension of overall vehicle range will result. Improved tank capacity per unit volume is achieved during refilling, particularly where nominal refill pressure is in the range of about 10,000 psi or greater for hydrogen and about 3,600 psi for CNG. It is also an object of the invention to utilize the cooling system in reverse, namely, to provide heat to the gas within the tank as the tank cools during evacuation as the vehicle is operated and the fuel is consumed, resulting in a lowered tank pressure. When the gas is heated, a benefit results that additional gas can be evacuated from the tank, further increasing the range of vehicle operation.

SUMMARY OF THE INVENTION

The invention provides a system that can remove the heat of compression resulting from the high pressure refueling of an on board vehicle tank decreasing refueling time, improving refueling efficiency, and increasing overall vehicle range. In accordance with the present invention, effective reduction of fuel tank heating during the refueling process is provided by introducing the refueling gas into an ejector pump that sucks out the hot gas from within the tank and circulates the hot gas through internal and external heat exchangers to cool the gas. The cooled gas and the refueling gas are mixed in the ejector and then both gas streams are directed into the vehicle storage tank. During vehicle operation, the cooling system is operated in reverse to warm gas in the tank to enhance tank evacuation as well as to maintain the temperature of the seals associated with the tank system warmer than the lower temperature limit of the seals.

In various embodiments, utilizing the refueling gas as a coolant has a limitation of cooling capacity. Some tanks which have a gas absorbing material such as metal hydride, MOF, carbon nano-tube, etc., release much more heat than the simple high pressure tank during a refueling. It is an object of the invention to improve the heat exchange ability in the refueling gas cooling tank.

In brief, the invention provides a system for reducing the energy and for reducing the time required to refill on board tanks on a vehicle from a high pressure fuel depot refilling line operatively interconnected to the tank wherein the refilling gas itself is circulated within the on board tank to absorb the compression heat of refueling, and the heat thereby absorbed, is radiated from the cooling circuit to an external environment before the fuel reaches the tank such that a close to optimum refill of the tank is achieved. In the invention, a gas jet ejector or Venturi pump utilizes the energy in the high pressure gas to create a lower pressure that can entrain another gas stream and provide a continuous circulation loop for greater cooling of the gas.

The invention is described more fully in the following description of the preferred embodiment considered in view of the drawings. As is evident from the context of the particular drawing figures, the figures are generally shown in cross section format and other views are inherently evident from the cross section renderings.

BRIEF DESCRIPTION OF THE SEVERAL VIEWS OF THE DRAWINGS

FIG. 1A and FIG. 1B are representational diagrams showing an example of cooling loop systems using internal and external heat exchangers, respectively, to absorb heat from the tank interior, and to radiate captured heat to the tank exterior.

FIG. 2B and FIG. 2C depict alternate forms of pump systems.

FIG. 3 depicts an embodiment of the invention utilizing an ejector pump in a valve and pressure regulated flow control for gas circulation.

DETAILED DESCRIPTION OF THE INVENTION

Figure 2A:
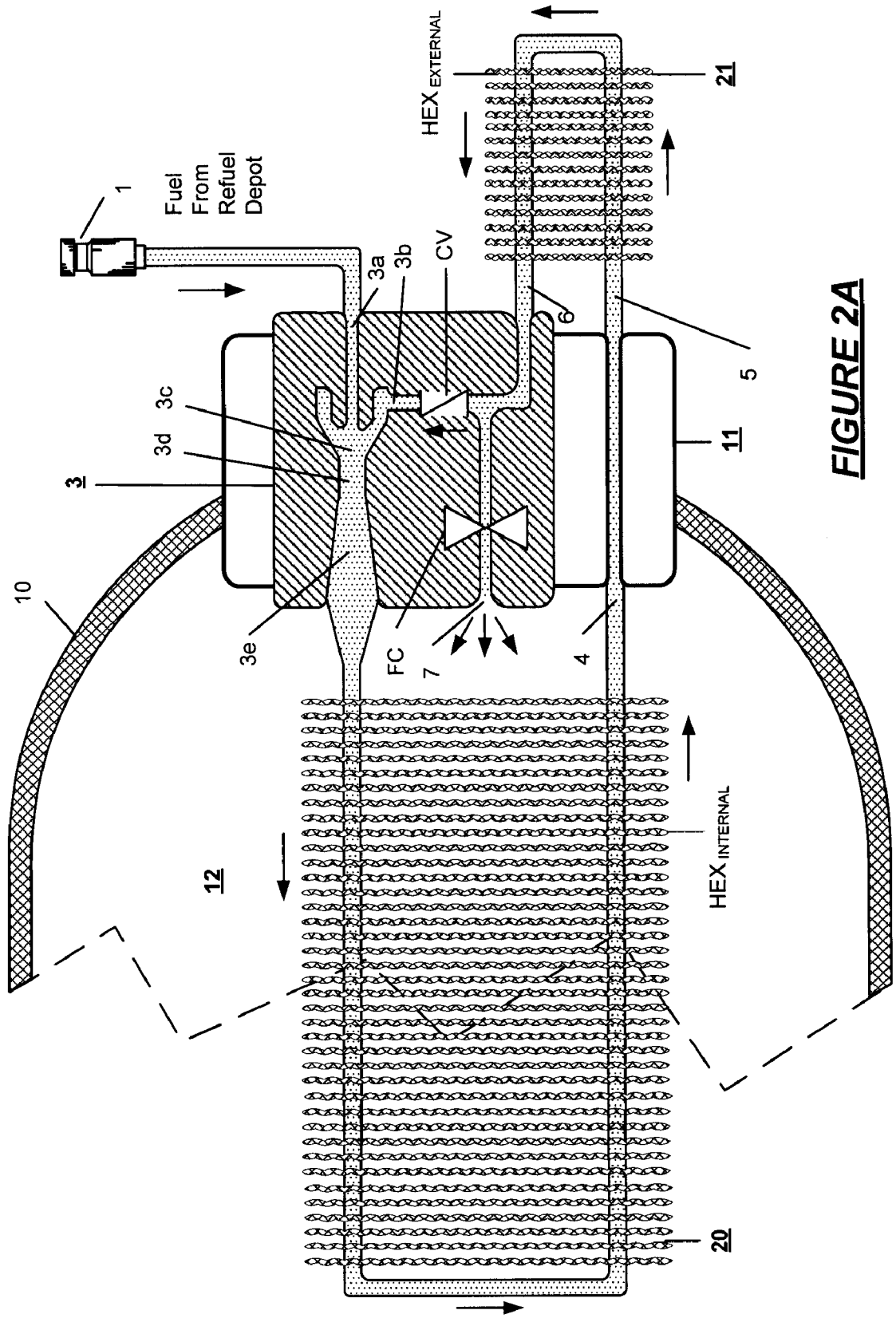
FIG. 2A shows an ejector pump circulation system.

Utilizing an ejector pump and flow control system, the invention increases the refueling energy efficiency of hydrogen powered vehicles by withdrawing the heat of refilling compression from the high pressure gas introduced into on board tanks. The circulating refueling gas is introduced into an ejector pump that circulates the hot gas in a loop through a heat exchanger where the gas is cooled down and a circulation cycle repeated. Afterwards, the cooler gas and the refueling gas are mixed in the ejector and then a portion of the gas flow, as so cooled, is introduced into the storage tank. During driving, the gas in the fuel tank is warmed by circulation through the external and internal heat exchangers.

With reference to FIG. 1A showing a principle of cooling by gas circulation, tank 10 includes interior storage volume 12 and end boss 11 that includes gas flow conduits therethrough for entry of the refill gas from refill receptacle 1 through $HEX_{INTERNAL}$ where heat is absorbed and $HEX_{EXTERNAL}$ where absorbed heat is radiated before the gas is introduced into the tank interior 12. In the circulation of a given volume of gas, the heat capacity of gas transfer in a single round trip is characterized as Q. In calculating Q, Q equals the mass of $H_2$ times the specific heat of hydrogen times dT, where the mass of $H_2$ is the quantity/volume of the refilling gas charge, dT is the difference in temperature between the outside of the tank, $T_{OUTSIDE}$ and the inside of the tank, $T_{INSIDE}$. For example, where the tank is to be charged with three kilograms of hydrogen:

$$Q[J] = 3 \text{ kg} \times 14.7 \text{ kJ/kg/K} \times (80° \text{ C.} - 30° \text{ C.}) = 2.2 \text{ MJ}.$$

Even if the heat exchangers have 100% efficiency, there is a theoretical limit for Q. No Q greater than Q from the above formula is possible in the single round trip circulation of the gas. Increasing the number of circulation loops of the gas, such as the double round trip shown in FIG. 1B, will result in a greater Q; however, problems with the practical implementation of multiple mechanical loops include the mouth of tank becomes bigger, and many tubes and parts are required, increasing the cost and weight of the systems.

FIG. 2A shows a cooling system using an ejector pump fixed at one end cap, boss, or port assembly 11 of a fuel storage tank 10. In the end cap 11, ejector pump 3 is disposed therein to provide a gas flow circuit in the system to and from the tank. Fuel depot receptacle 1 is interconnected with a control for gas flow into the vehicle tank during refill and insures that the system is otherwise closed at all other times. At refill, gas flow indicated by arrows→is introduced into ejector pump 3. Ejector pump 3 provides gas flow from the pump inlet 3a whereby jet chamber 3d follows the nozzle 3c that leads from inlet 3a. Gas flows from receptacle 1 into the ejector inlet 3a and out through ejector throat 3d into the internal heat exchanger 20 from which gas exits through conduit 4-5 to external heat exchanger 21. After passing through external HEX 5-6, gas is directed to the suction inlet for gas flow to the pump shown at 3b. Valve CV is a check valve interposed in the flow loop allowing gas to flow into the pump inlet 3b and to prevent backflow therefrom. Circulating through the ejector, gas flows in one or more repeating loops or circuits through internal HEX 20, through external HEX 21, and ultimately, the cooled gas is introduced into the tank through conduit outlet 7. A flow control FC, such as an orifice, regulator or valve is interposed in circuit 6-7 to maintain the circulation flow.

There is thus provided a multi circulation cooling method for a continuous gas loop passing through internal and external heat exchange devices. The refueling gas goes around in a circulating heat exchange line. The gas's pressure itself or a pump is used to make the circulation flow. The ejector pump shown in FIG. 2A is preferable; an alternate form of ejector is shown in FIG. 2B; however, as shown in FIG. 2C at 210, any pump could be used. A portion of the looping gas goes into the tank; the refuel gas circulates many times in this loop, allowing greater heat transfer in cooling the gas.

Valve CV in FIG. 2A is a one way valve that stops a black flow and maintains the correct circulation flow through at least one loop. For example, if the tank pressure is mostly full, the ejector will not have sufficient pressure difference between the refueling gas and tank, thereby causing the back flow that CV prevents. The system allows multiple loop circulation of gas flow allowing greater heat transfer in cooling the gas during refill. As illustrated in FIG. 3, an integrated flow control system is embedded in tank boss 11 with an ejector pump 3. Separate pump module 11A and separate flow control module 11B may be provided. In FIG. 3, gas from receptacle 1 enters ejector pump inlet 3a and passes therethrough to exit through outlet 3e, circulating through internal HEX 20 through tank boss conduit 4-5 to external HEX 21 flowing through conduit 6 to switchable valve V2. Valve V2 includes inlet/outlet port $V2_C$ and switchable port $V2_A$ leading to tank inlet 7 through check valve CV2 and the suction inlet of the ejector pump 3 and switchable port $V2_B$ leading from tank outlet 8 and pressure regulator PR2. In FIG. 3, an interconnection of the gas flow loop to power plant supply through V1 and PR1 is also shown whereby gas is exhausted from the tank during driving. Where to and from references are used, the respective objects referred to may be reversed depending on relative perspective or direction of gas flow.

Figure 4A:
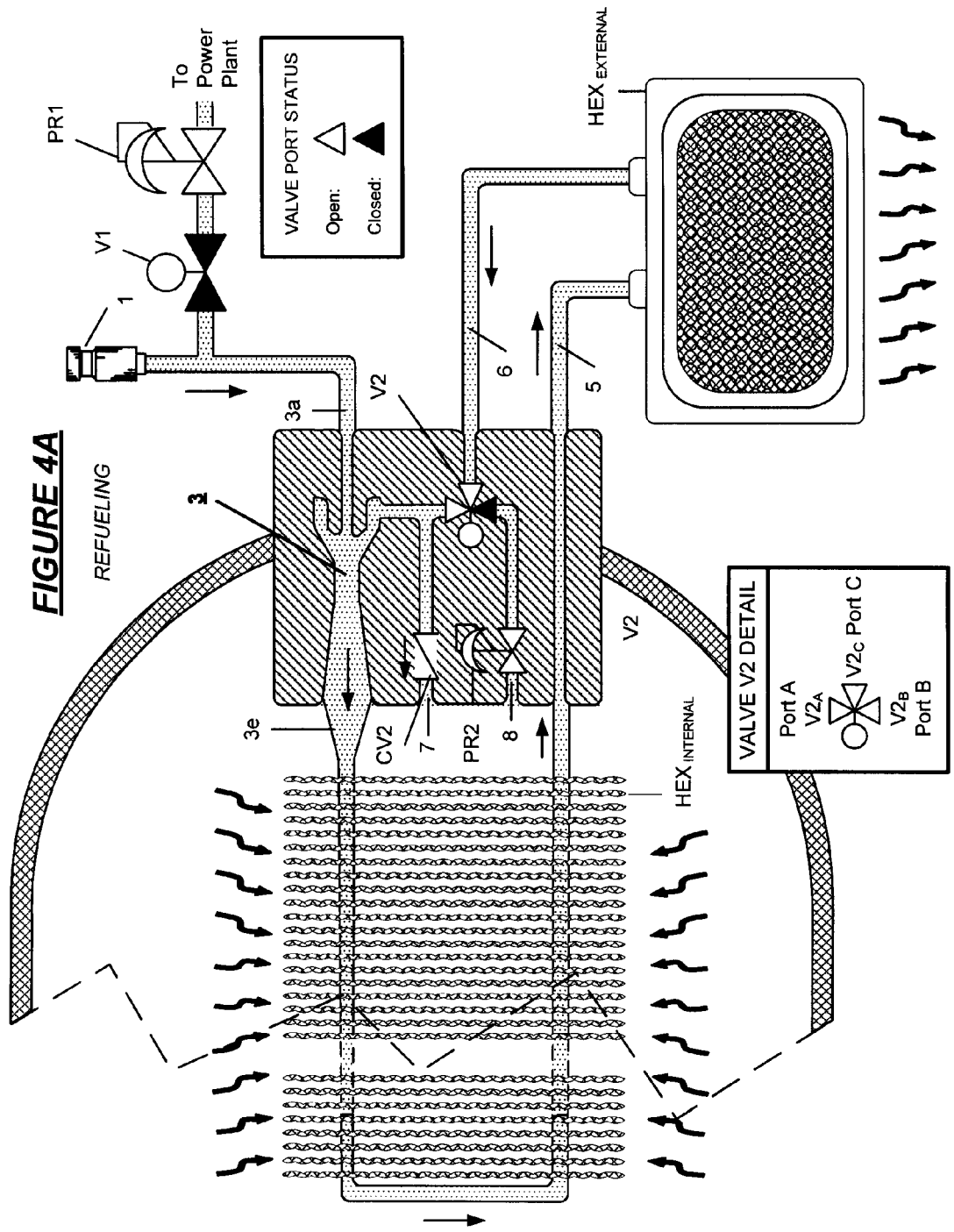
FIG. 4A, FIG. 4B and FIG. 4C depict, respectively, an embodiment of the invention in the vehicle modes of refueling, driving and parking.
Figure 4B:
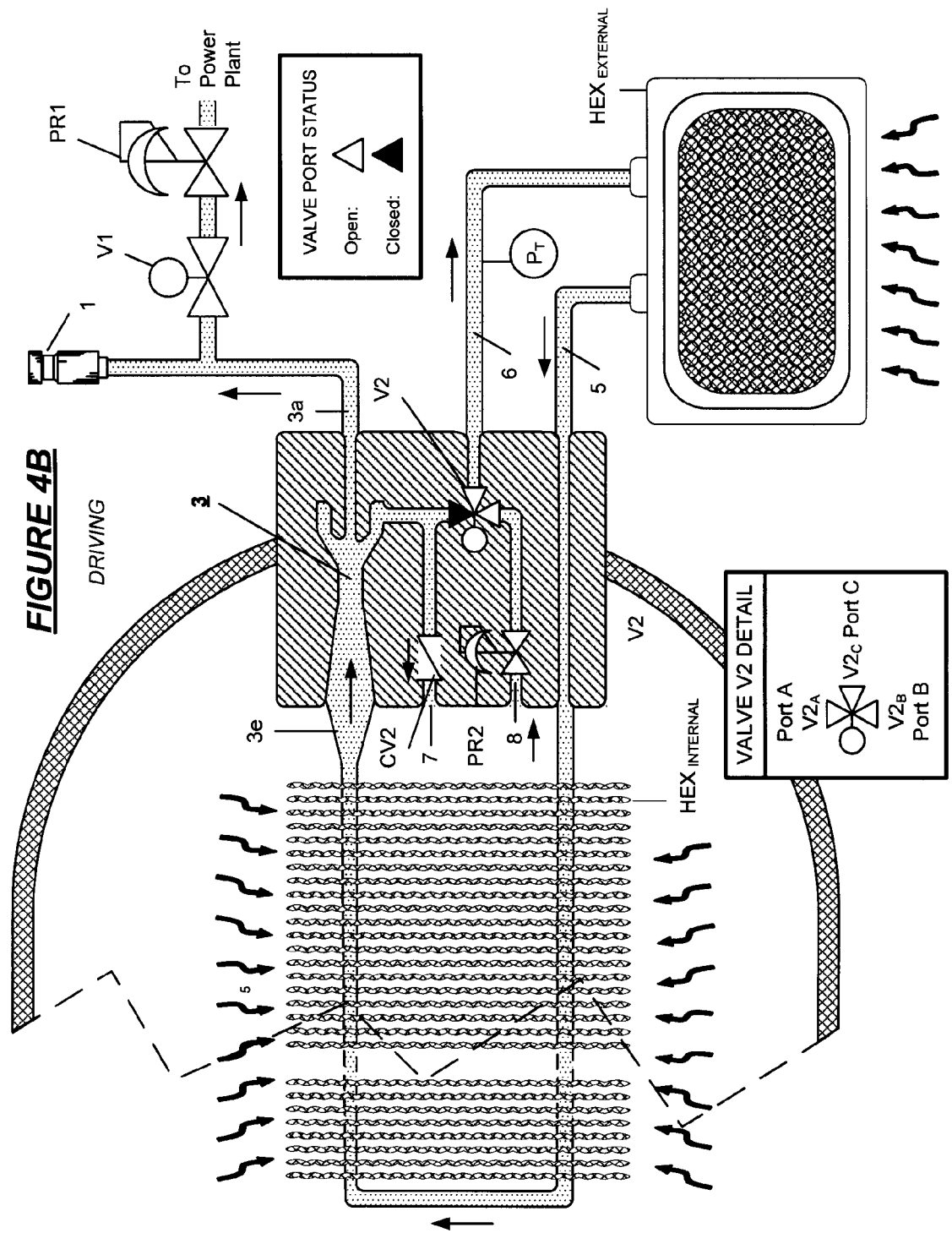
Figure 4C:
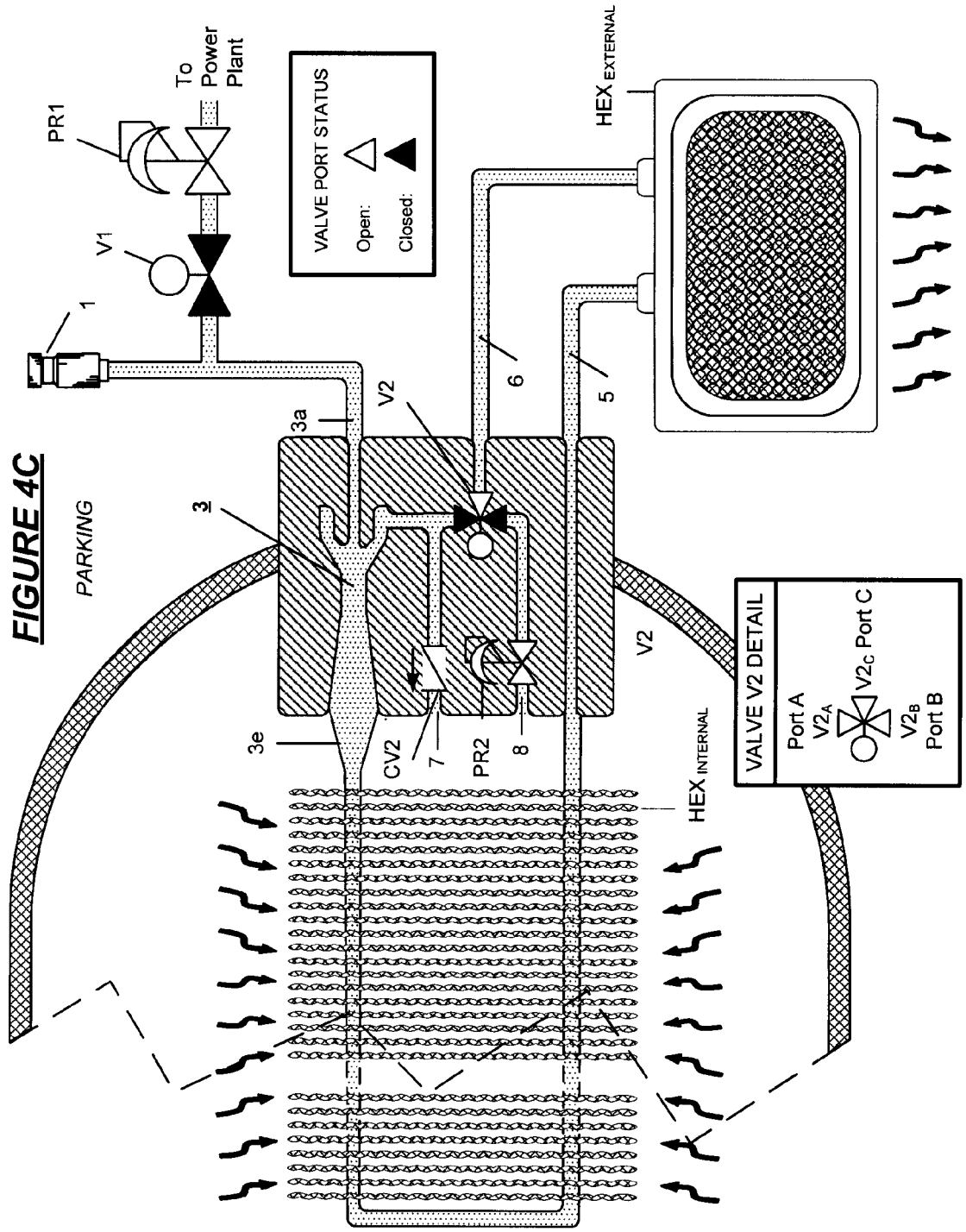

The multi loop circulation system is illustrated in the vehicle modes of refueling, driving and parking, respectively in FIG. 4A, FIG. 4B and FIG. 4C. In the drawing figures, open valves are shown as Δ, closed valves are shown as ▲, and gas flow is shown by the arrows→. In the vehicle operation modes shown in FIG. 4A, FIG. 4B and FIG. 4C, cooling is effected during refill; in driving, low pressure operation occurs in the tubes and warming of gas in the tank during driving results as the heat exchange flow from the external HEX to the internal HEX is reversed. Complete shut off of all gas flow is made during parking. In FIG. 4A, FIG. 4B and FIG. 4C, an example is shown wherein a gas flow circulation valve V2 is a switchable valve having three ports for directing the flow of gas, Port $V2_A$, Port $V2_B$ and Port $V2_C$. An inset in the figures identifies the valve port detail. In the first refueling mode of the system shown in FIG. 4A, V1 is closed, preventing gas flow to the power plant. V2 is open on port side $V2_A$, the refueling gas circulates to remove the heat from the inside of the tank. In the driving mode of FIG. 4B, V2 is opened on port side $V2_B$ and V1 is opened to allow gas flow to operate the power plant. As a result of fuel consumption, the pressure in the circulation tubs $P_T$ lowers. After the $P_T$ is reduced to lower than a predetermined value, PR2 will open to maintain $P_T$ constant. The fuel gas receives heat in the external heat exchanger, after that releases heat into the internal heat exchanger, a process that can warm up the inside of the tank with the low pressure fuel gas, a system safer than using high pressure in the tubes. In the parking mode shown in FIG. 4C, V1 is closed and all ports on V2 are closed and $P_T$ is the same pressure as driving.

Figure 5:
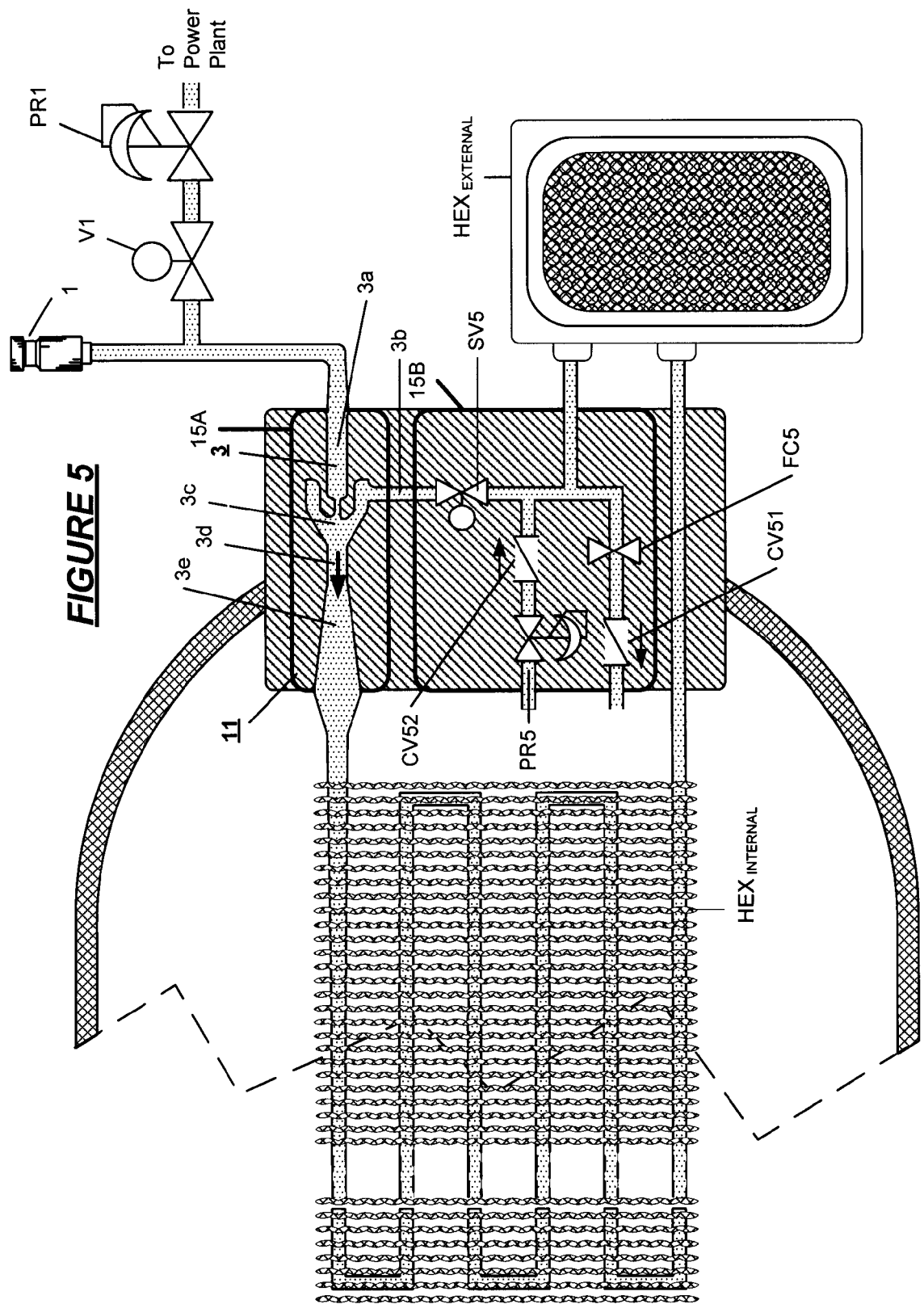
FIG. 5 shows a further example of a flow control system for a circulating coolant in accordance with the invention.

FIG. 5 shows a further example of a flow control system for a circulating coolant in accordance with the invention wherein switch valve SV5 is interposed in front of the suction inlet of the ejector pump 3 and check valves CV51 and CV52 regulate gas flow into and from the tank. Flow control FC5 (orifice, regulator or valve) and tank exit flow pressure regulator PR5 are also included in the system, the operation of which, in the modes of refueling, driving and parking, are evident to one of skill in the art from the foregoing explanation. Separate pump module 15A and separate flow control module 15B may be provided.

As is disclosed in my previous applications, the heat exchanger is a matter of design choice and may be in the form of a radiator and may include fins, pins, plates, wave shaped radiators, mesh, corrugation like elements, or other like devices having high thermal conductivity and high surface area per unit volume or weight, allowing for the maximum thermal efficiency with regard to heat absorbed and heat radiated. A fan or blower may be operatively disposed with respect to the external heat exchanger—operatively dependent on factors such as radiator capacity, rate of heat transfer to the heat sink and the radiator, temperature of heat transferred, fan or blower (cubic feet per minute (cfm)) capacity effective at the radiator, temperature of the ambient external environment, and the like. A control system for the fan and or pump may be configured to interrelate the foregoing factors and determine appropriate fan and or pump speed, on and off timing, and the like. For example, if a vehicle air conditioner subsystem is used for cooling, the AC should be turned on during refill.

As with my previous applications noted above, the system is adaptable to multiple tanks and a vehicle control system providing selectable or controllable inlet valves and selectable or controllable outlet valves for the tanks and the coolant system operatively interconnected with a control means, logic circuit, or CPU on the vehicle. The vehicle control system also monitors pressure and/or temperature or other sensing means associated with the tanks or their inlet and outlet lines, the cooling fluid circulation lines, and the fluid pump and/or and may be adapted to control vehicle operation accordingly. Specific control configurations and parameters, and sensors, valve locations and systems in accordance with the principles of the invention are preferably based on overall vehicle design considerations. For example, pressure, temperature and other sensors and controls may be provided to monitor tank and/or line pressures and temperatures, to start, stop and adjust fluid flow, fan speed and duration, and other parameters associated with a proper operating protocol of the ejector pump and vehicle tank or valve system for refilling and consumption of pressurized fuel in the course of vehicle operation. HEX devices may be supplemented or replaced by the vehicle frame or sub frame systems.

In all instances described herein, it is assumed that during the state of refueling, the outlet valves for each tank are closed; and during the instance of consumption, the inlet valves for each tank are closed and the cooling fluid correspondingly circulated in a manner typically monitored and controlled by a vehicle operation system. The on board vehicle tank system may include a plurality of on board tanks that may have a filling or consuming sequence wherein all tanks are filled or evacuated in parallel simultaneously or all tanks are filled or exhausted separately in a series order essentially one at a time.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A heat management system for a high pressure gas tank comprising a) a loop circulation path for the gas including a path through an internal heat exchanger in the tank connected to a path through a heat exchanger external to the tank, b) an inlet for the path connectable to a high pressure source of refuel gas, wherein, when the inlet is engaged with the source of refuel gas, the refueling gas circulates multiple times in the loop through the internal heat exchanger and the external heat exchanger and in the course of circulation, a portion of the gas from the refuel source is mixed with the gas in the loop and the mixed gases are introduced into the tank.

2. Apparatus in accordance with claim 1 including a pump interposed in the in the circulation path to power the circulation of the gas in the loop.

3. The apparatus of claim 2 wherein the pump is a Venturi pump.

4. The apparatus of claim 1 wherein the circulation path for the gas in the loop includes check valves at the tank inlet opening and at a tank outlet opening.

5. The apparatus of claim 1 including a pump that circulates gas within the loop, wherein the circulation path for the gas in the loop includes a two way switching valve interposed in the path between an outlet of the external heat exchanger, the switching valve directing, in a first position, gas flow from the external heat exchanger to the inlet of the pump and from the pump to a gas flow inlet to the tank, and in a second position, gas flow from the tank to an inlet of the pump and through the pump to the external heat exchanger and then to the internal heat exchanger.

6. The apparatus of claim 1 including a pump that circulates gas within the loop, wherein the circulation path for the gas in the loop includes a switch valve interposed in the path between one side of the external heat exchanger and the inlet of the pump and the loop includes check valves at the gas inlet to the tank and a gas outlet from the tank, the gas inlet to the tank and the gas outlet from the tank being interconnected between the one side of the switch valve facing the inlet of the pump and an outlet of the external heat exchanger.

7. A warming system for an on board high pressure gas storage tank for a vehicle in accordance with claim 1 wherein during a driving mode of vehicle operation, when gas is being exhausted from the tank, gas flows in a loop from the tank through the external heat exchanger and then through the internal heat exchanger where heat is conveyed to the tank interior to warm the gas in the tank interior and a portion of the gas from the loop is mixed with the gas in the tank as the gas is exhausted from the tank.

8. Apparatus of claim 5 wherein the pump is a Venturi pump.

9. Apparatus of claim 6 wherein the pump is a Venturi pump.

10. Apparatus of claim 8 wherein the inlet of the pump is a suction inlet of the Venturi pump.

11. Apparatus of claim 9 wherein the inlet of the pump is a suction inlet of the Venturi pump.

12. Apparatus of claim 1 wherein the circulation path for the gas is defined by a conduit.

13. A heat management system for a high pressure gas tank installed on a vehicle comprising a circulation path for the gas through a) a tank inlet, b) an internal heat exchanger in the tank, c) a tank outlet, and d) through a heat exchanger external to the tank, wherein:

1) when high pressure gas is being introduced into the tank through the inlet as the tank is being refueled: a) refueling gas circulates multiple times in the path through the internal heat exchanger and the external heat exchanger, b) the refuel gas and the circulated gas are mixed and a portion of the mixed gases is introduced into the tank, and c) the circulation ceases when either i) a temperature of the mixed gases reaches a predetermined level or ii) the tank is filled, and 2) when the gas is being exhausted from the tank: a) the gas to be exhausted circulates from the outlet of the tank through the external heat exchanger to the internal heat exchanger, b) the gas being exhausted and the circulated gas are mixed and a portion of the mixed gases is exhausted from the tank, and c) the circulation ceases when either i) a temperature of the mixed gases reaches a predetermined level or ii) a need for gas from the tank ceases, and, d) if the temperature of the gas being exhausted drops below a predetermined level, the circulation of the gas resumes and the steps of sections 2) a), 2) b) and 2) c) are repeated.

* * * * *